US009014188B2

(12) United States Patent
Kanai et al.

(10) Patent No.: US 9,014,188 B2
(45) Date of Patent: Apr. 21, 2015

(54) COMMUNICATION SYSTEM

(75) Inventors: Taiki Kanai, Tokyo (JP); Akira Sakurai, Tokyo (JP); Atsuya Yamashita, Tokyo (JP); Hiroaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 765 days.

(21) Appl. No.: 13/139,605

(22) PCT Filed: Nov. 13, 2009

(86) PCT No.: PCT/JP2009/006065
§ 371 (c)(1),
(2), (4) Date: Jun. 14, 2011

(87) PCT Pub. No.: WO2010/073474
PCT Pub. Date: Jul. 1, 2010

(65) Prior Publication Data
US 2011/0244813 A1      Oct. 6, 2011

(30) Foreign Application Priority Data

Dec. 24, 2008   (JP) ................................ 2008-327178

(51) Int. Cl.
*H04L 12/28*       (2006.01)
*H04W 28/06*      (2009.01)
(Continued)

(52) U.S. Cl.
CPC ........... *H04W 28/065* (2013.01); *H04L 49/252* (2013.01); *H04L 45/46* (2013.01); *H04L 47/17* (2013.01); *H04L 49/901* (2013.01); *H04W 28/08* (2013.01)

(58) Field of Classification Search
None
See application file for complete search history.

(56) References Cited

U.S. PATENT DOCUMENTS 5,771,462 A    6/1998   Olsen
5,787,086 A *  7/1998   McClure et al. .............. 370/413
(Continued)

FOREIGN PATENT DOCUMENTS

| CN | 1255028 A | 5/2000 |
| CN | 1777171 A | 5/2006 |

(Continued)

OTHER PUBLICATIONS

International Search Report for PCT/JP2009/006065 mailed Feb. 16, 2010.
(Continued)

*Primary Examiner* — Khoa Huynh
(74) *Attorney, Agent, or Firm* — Sughrue Mion, PLLC

(57) ABSTRACT

This communication system is equipped with a plurality of transceiver devices each composed of a transmission device that transmits unit data and a reception device that receives unit data from the transmission device. The transmission devices are connected in series. Each of the transmission devices stores identification information for identifying the device itself. The transmission device accepts unit data from a front stage side. The transmission device generates identification information for identifying one of the transmission devices from information included in the accepted unit data, in accordance with a predetermined generation process. In a case that the generated identification information corresponds to the stored identification information, the transmission device transmits the accepted unit data to the reception device. In a case that the generated identification information does not correspond to the stored identification information, the transmission device sends the accepted unit data to a back stage side.

13 Claims, 7 Drawing Sheets

(51) Int. Cl.
*H04L 12/947* (2013.01)
*H04L 12/715* (2013.01)
*H04L 12/801* (2013.01)
*H04L 12/879* (2013.01)
*H04W 28/08* (2009.01)

(56) References Cited

U.S. PATENT DOCUMENTS

| | | | | |
|---|---|---|---|---|
| 7,295,552 B1 * | 11/2007 | Kadambi et al. | ............... | 370/392 |
| 2002/0049859 A1 * | 4/2002 | Bruckert et al. | ............... | 709/246 |
| 2008/0205448 A1 | 8/2008 | Tanahashi | | |

FOREIGN PATENT DOCUMENTS

| | | |
|---|---|---|
| EP | 0637151 A1 | 7/1994 |
| EP | 1 283 622 A2 | 2/2003 |
| GB | 2379136 A | 2/2003 |
| JP | 2002191073 A | 7/2002 |
| JP | 2003143640 A | 5/2003 |
| JP | 2008078906 A | 4/2008 |
| NL | 9400548 A | 11/1995 |
| WO | 0156190 A2 | 8/2001 |
| WO | 2006137480 A | 12/2006 |

OTHER PUBLICATIONS

Chinese Office Action for CN Application No. 200980152174.7 issued on Jun. 24, 2013 with English Translation.
The Extended European Search Report for EP Application No. EP09834290.0 dated on Nov. 21, 2014.

* cited by examiner

US 9,014,188 B2

COMMUNICATION SYSTEM

The present application is the National Phase of PCT/JP2009/006065, filed Nov. 13, 2009, which is based upon and claims the benefit of priority from Japanese patent application No. 2008-327178, filed on Dec. 24, 2008, the disclosure of which is incorporated herein in its entirety by reference.

TECHNICAL FIELD

The present invention relates to a communication system equipped with a transmission device that transmits data and a reception device that receives the data.

BACKGROUND ART

A communication system equipped with a transmission device that transmits data and a reception device that receives the data is known. In a communication system described in Patent Document 1 as one of communication systems of this type, a transmission device is equipped with a plurality of radio communication devices and a data decomposition/composition converter. In a like manner, a reception device is equipped with a plurality of radio communication devices and a data decomposition/composition converter. That is to say, this communication system is equipped with plural pairs of radio communication devices.

The data decomposition/composition converter of the transmission device divides inputted data into a plurality of unit data, and sends each of the unit data to the radio communication device corresponding to the unit data. The respective radio communication devices accept the unit data sent by the data decomposition/composition converter, and transmit the accepted unit data to the radio communication devices of the reception device.

The data decomposition/composition converter of the reception device converts the unit data received by the respective radio communication device to restore the data inputted into the transmission device.

With such a communication system, it is possible to make a communication bandwidth broader (a communication speed higher) than in the case of transmitting and receiving data by using only one pair of communication radio devices.

[Patent Document 1] Japanese Unexamined Patent Application Publication No. JP-A 2002-191073

In the communication system described above, it is impossible to change a communication bandwidth without changing the configuration of the data decomposition/composition converter. That is to say, there is a problem that it is impossible to easily change a communication bandwidth.

SUMMARY

Accordingly, an object of the present invention is to provide a communication system capable of solving the aforementioned problem, "it is impossible to easily change a communication bandwidth."

In order to achieve the object, a communication system of an embodiment of the present invention is equipped with a plurality of transceiver devices each composed of a transmission device that transmits unit data obtained by decomposing data by a predetermined unit in order to transmit and receive the data and a reception device that receives the unit data transmitted by the transmission device.

The plurality of transmission devices are connected in series.

Furthermore, the transmission device is equipped with: a transmission device identification information storing means configured to store transmission device identification information for identifying the device itself; a unit data accepting means configured to accept the unit data from a front stage side; a transmission device identification information generating means configured to generate transmission device identification information for identifying any one of the plurality of transmission devices from in-unit-data information included in the accepted unit data, in accordance with a predetermined generation process; a unit data transmitting means configured to, in a case that the generated transmission device identification information corresponds to the stored transmission device identification information, transmit the accepted unit data to the reception device configuring the transceiver device together with the transmission device; and a unit data sending means configured to, in a case that the generated transmission device identification information does not correspond to the stored transmission device identification information, send the accepted unit data to a transmission device connected to a back stage side.

Further, a transmission device of another embodiment of the present invention is equipped with: a transmission device identification information storing means configured to store transmission device identification information for identifying the device itself; a unit data accepting means configured to accept unit data obtained by decomposing data by a predetermined unit in order to transmit and receive the data; a transmission device identification information generating means configured to generate transmission device identification information from in-unit-data information included in the accepted unit data, in accordance with a predetermined generation process; a unit data transmitting means configured to, in a case that the generated transmission device identification information corresponds to the stored transmission device identification information, transmit the accepted unit data to a reception device configuring a transceiver device together with the device itself; and a unit data sending means configured to, in a case that the generated transmission device identification information does not correspond to the stored transmission device identification information, send the accepted unit data.

Further, a communication method of another embodiment of the present invention is applied to a communication system which is equipped with a plurality of transceiver devices each composed of a transmission device that transmits unit data obtained by decomposing data by a predetermined unit in order to transmit and receive the data and a reception device that receives the unit data transmitted by the transmission device, and in which the plurality of transmission devices are connected in series.

Furthermore, the communication method including: accepting the unit data from a front stage side, by the transmission device; generating transmission device identification information for identifying any one of the plurality of transmission devices from in-unit-data information included in the accepted unit data, in accordance with a predetermined generation process, by the transmission device; in a case that transmission device identification information stored by the transmission device in order to identify the device itself corresponds to the transmission device identification information generated by the transmission device, transmitting the accepted unit data to the reception device configuring the transceiver device together with the transmission device, by the transmission device; and in a case that transmission device identification information stored by the transmission device in order to identify the device itself does not correspond to the transmission device identification information generated by the transmission device, sending the accepted unit data to a transmission device connected to a back stage side, by the transmission device.

Further, a computer program of another embodiment of the present invention is a computer program for causing a transmission device to realize: a unit data accepting means configured to accept unit data obtained by decomposing data by a predetermined unit in order to transmit and receive the data, from a front stage side; a transmission device identification information generating means configured to generate transmission device identification information from in-unit-data information included in the accepted unit data in accordance with a predetermined generation process; a unit data transmitting means configured to, in a case that transmission device identification information stored by the transmission device in order to identify the device itself corresponds to the generated transmission device identification information, transmit the accepted unit data to a reception device configuring a transceiver device together with the device itself; and a unit data sending means configured to, in a case that transmission device identification information stored by the transmission device in order to identify the device itself does not correspond to the generated transmission device identification information, send the accepted unit data to a back stage side.

With the configurations as described above, the present invention makes it possible to easily change a communication bandwidth.

EMBODIMENT

Below, the respective exemplary embodiments of a communication system, a transmission device, a communication method and a computer program according to the present invention will be described with reference to FIGS. 1 to 7.
<First Exemplary Embodiment>
(Configuration)

Figure 1:
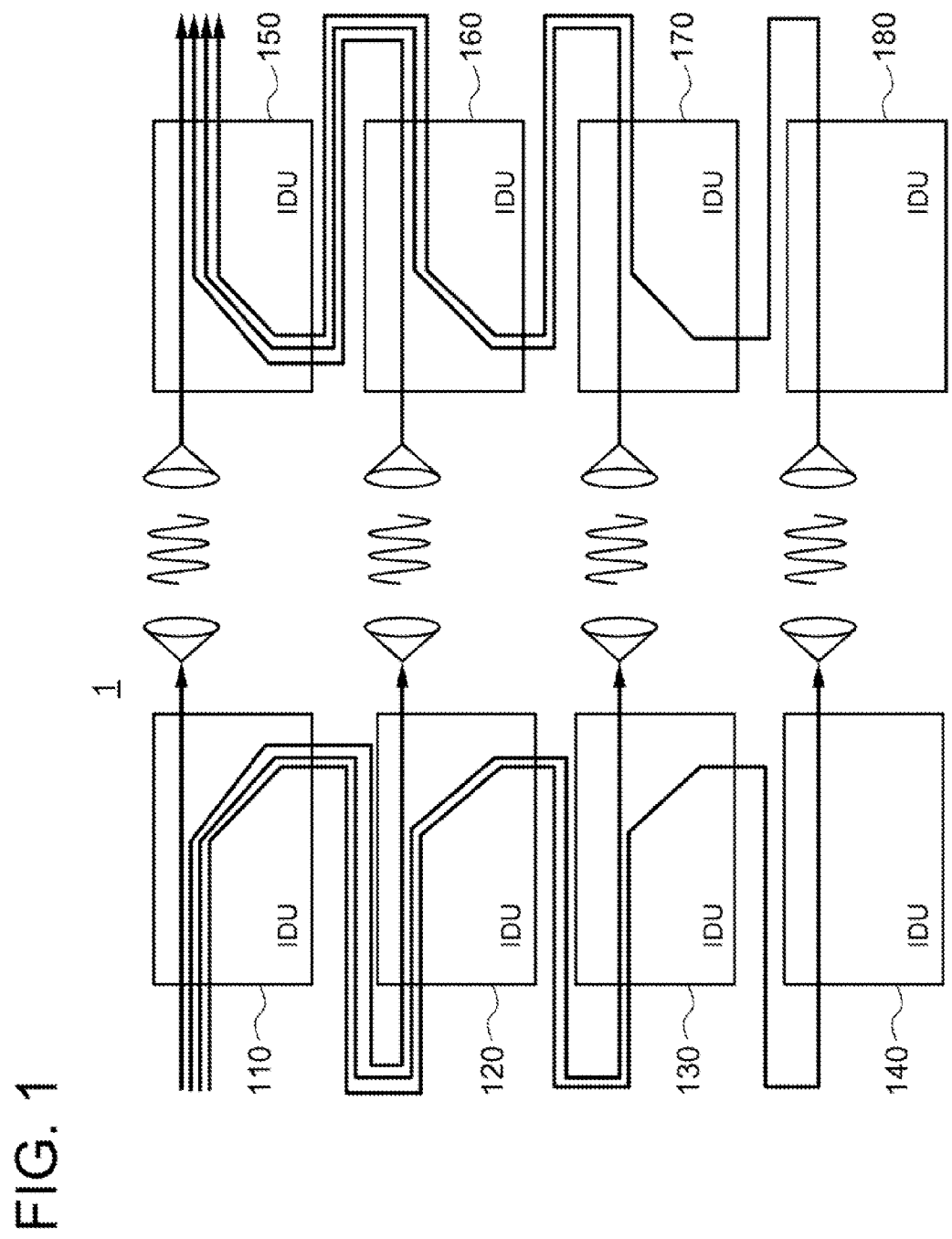
FIG. 1 is a diagram showing a schematic configuration of a communication system according to a first exemplary embodiment of the present invention.

As shown in FIG. 1, a communication system 1 according to a first exemplary embodiment is equipped with a plurality of communication devices 110 to 180. Each of the communication devices 110 to 180 is a radio communication device that performs radio communication. In this exemplary embodiment, each of the communication devices 110 to 180 is an In-Door Unit (IDU).

Although transmission of data from the communication devices 110 to 140, to the communication devices 150 to 180 will be described in this exemplary embodiment, transmission of data from the communication devices 150 to 180, to the communication devices 110 to 140 will be described in a like manner. Therefore, in this exemplary embodiment, the communication devices 110 to 140 configure a transmission device, and the communication devices 150 to 180 configure a reception device.

In this exemplary embodiment, the communication device 110 and the communication device 150 configure one transceiver device. That is to say, the communication device 110 transmits unit data (in this exemplary embodiment, a frame) obtained by decomposing data by a predetermined unit in order to transmit and receive the data, to the communication device 150. Unit data may be a packet, a segment, or the like. The communication device 150 receives a frame transmitted by the communication device 110.

In a like manner, the communication devices 120 and 160 configure one transceiver device, the communication devices 130 and 170 configure one transceiver device, and the communication devices 140 and 160 configure one transceiver device.

The respective communication devices 110 to 180 have the same configurations. Therefore, only the communication device 110 will be described below.

Figure 2:
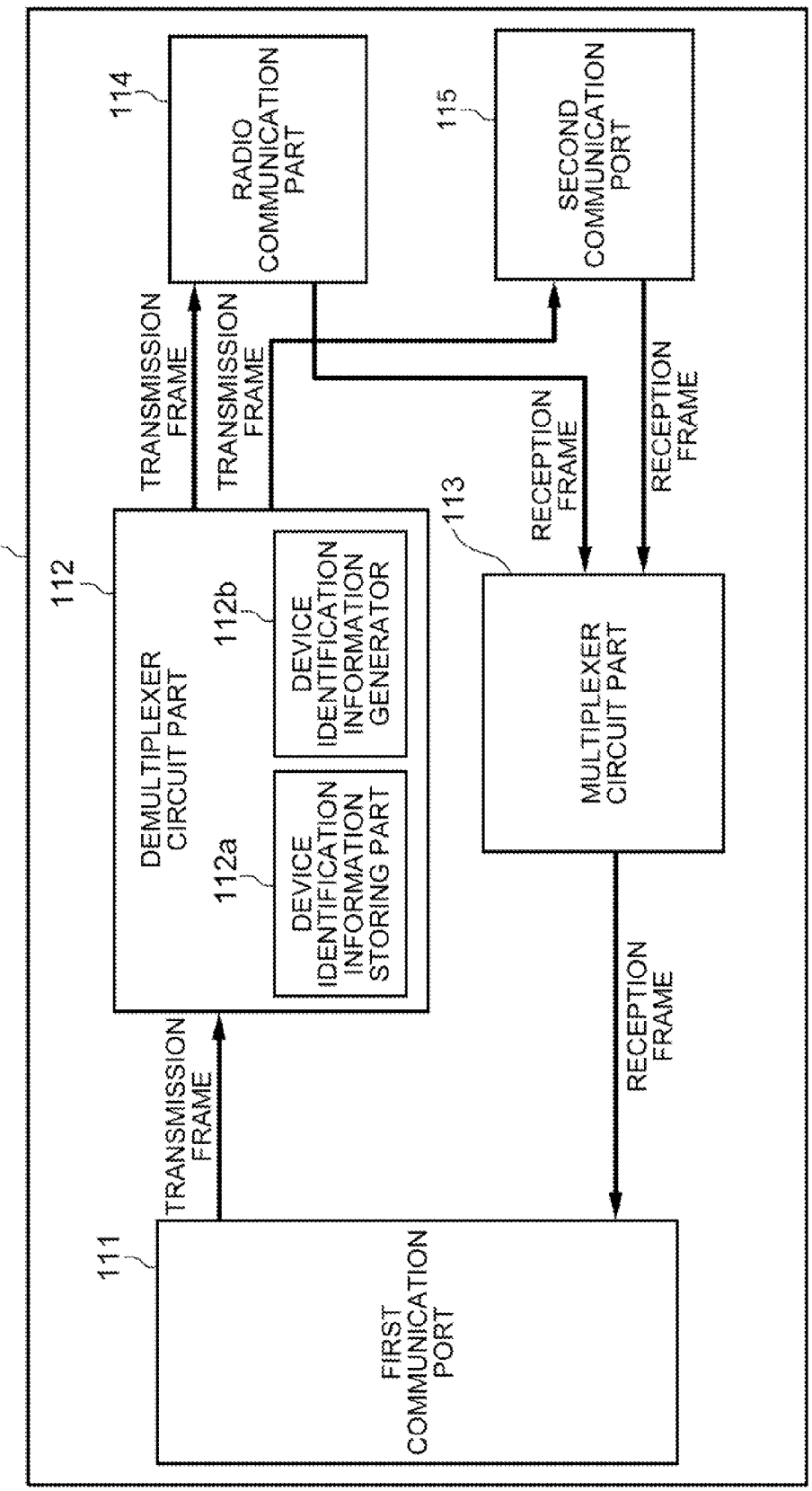
FIG. 2 is a diagram showing a schematic configuration of a transmission device shown in FIG. 1.

As shown in FIG. 2, the communication device 110 is equipped with a first communication port (PHY) 111, a demultiplexer circuit part (Demux) 112, a multiplexer (Mux) 113, a radio communication part (Radio Frame) 114, and a second communication port (Stack Port) 115.

The first communication port 111 is a port for LAN (Local Area Network). The first communication port 111 terminates a frame. The communication device 110 is connected to a server device, which is not shown in the drawings, via the first communication port. This server device sends a frame (a transmission frame) to the communication device 110

The demultiplexer circuit part 112 accepts a frame (a transmission frame) via the first communication port 111. That is to say, the first communication port 111 and the demultiplexer circuit part 112 configure a unit data accepting means that accepts a frame (unit data) from the front stage side.

The demultiplexer circuit part 112 sends the accepted frame (the transmission frame) to the radio communication part 114 or the second communication port 115.

The demultiplexer circuit part 112 includes a device identification information storing part (a transmission device identification information storing means) 112a and a device identification information generator (a transmission device identification information generating means) 112b.

The device identification information storing part 112a previously stores device identification information (transmission device identification information) for identifying a device itself. The device identification information stored in the device identification information storing part 112a is information that is uniquely applied to each of the communication devices 110 to 180. In this exemplary embodiment, the communication device 110 stores device identification information representing "0," the communication device 120 stores device identification information representing "1," the communication device 130 stores device identification information representing "2," and the communication device 140 stores device identification information representing "3." The communication devices 150 to 180 also store in a like manner.

The device identification information generator 112b generates transmission device identification information (a load balance ID) for identifying any one of the communication devices 110 to 140 from header information (in-unit-data information) included in the accepted frame (the transmission frame), in accordance with a predetermined generation process.

Figure 3:
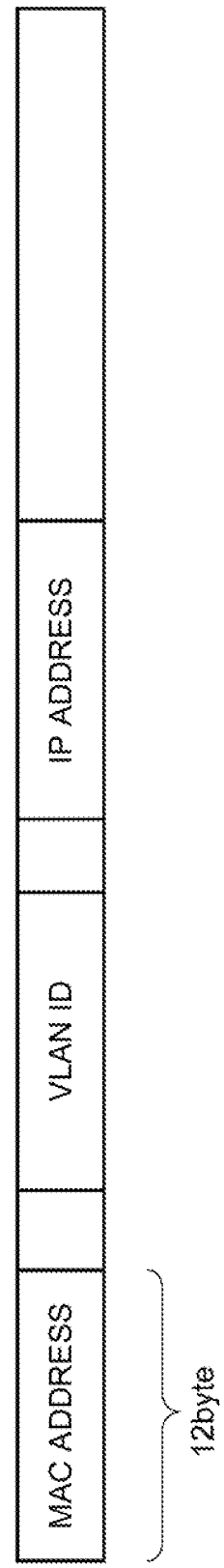
FIG. 3 is an explanation view conceptually showing header information included in a frame.
Figure 4:
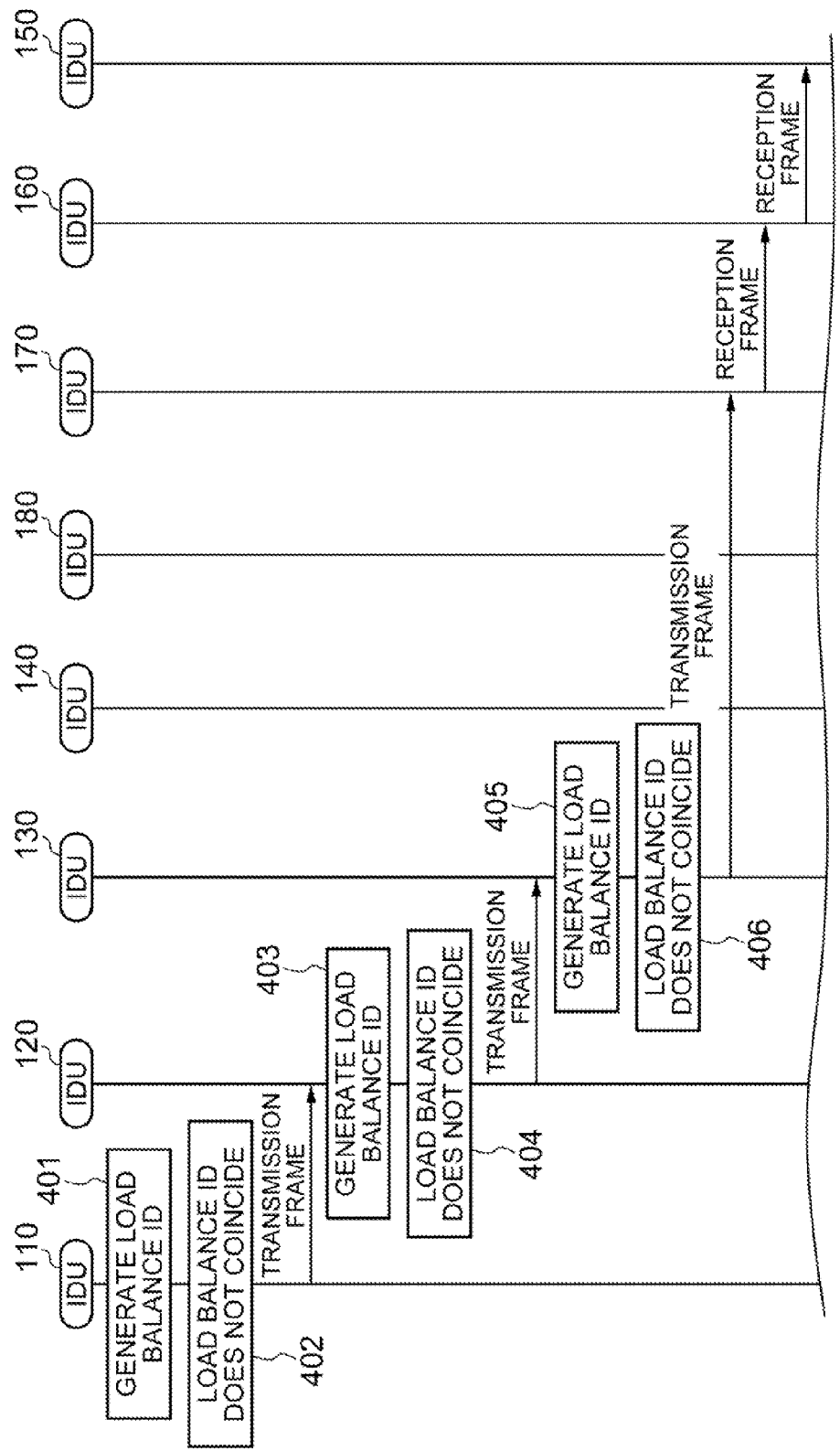
FIG. 4 is a sequence diagram showing an operation of the communication system according to the first exemplary embodiment of the present invention.
Figure 5:
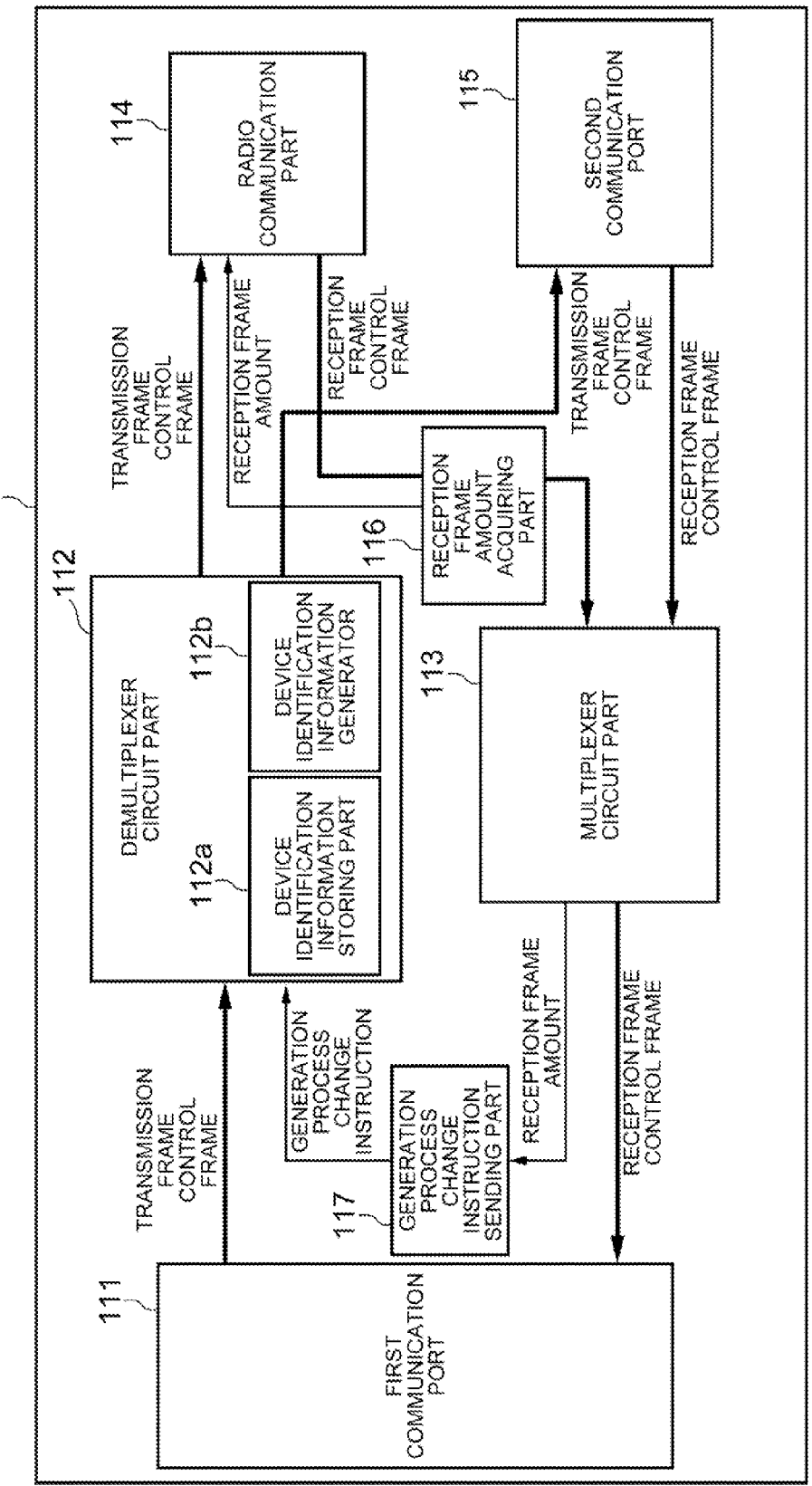
FIG. 5 is a diagram showing a schematic configuration of a communication device according to a second exemplary embodiment of the present invention.

In this exemplary embodiment, as shown in FIG. 3, header information includes information representing a MAC (Media Access Control) address, information representing VLAN (Virtual Local Area Network) ID (Identification), and information representing an IP (Internet Protocol) address. Information representing a MAC address is 12-byte information.

Header information may include information representing an MPLS (Multi Protocol Label Switching) label. Moreover, header information may be information including at least one of information representing a MAC address, information representing VLAN-ID, and information representing an IP address.

The device identification information generator 112b decomposes information representing a MAC address (12-byte information) into bytes. Then, from each piece of the 1-byte information obtained by decomposition, the device identification information generator 112b acquires 1-bit information of the least significant bit of the information. Next, the device identification information generator 112b calculates the exclusive or of twelve pieces of 1-bit information having been acquired.

Further, from each piece of the 1-byte information obtained by decomposition, the device identification information generator 112b acquires 1-bit information positioned on the 1-bit upper side of the least significant bit of the information. Next, the device identification information generator 112b calculates the exclusive or of twelve pieces of 1-bit information having been acquired.

Furthermore, from each piece of the 1-byte information obtained by decomposition, the device identification information generator 112b acquires 1-bit information positioned on the 2-bit upper side of the least significant bit of the information. Next, the device identification information generator 112b calculates the exclusive or of twelve pieces of 1-bit information having been acquired.

Then, the device identification information generator 112b calculates, as a load balance ID, information representing a remainder (i.e., an integer of 0 to 3) obtained by dividing an integer represented by 3-bit information composed of the three exclusive ors having been calculated by the number of the communication devices (in this exemplary embodiment, four) configuring the transmission device.

In a case that the load balance ID generated by the device identification information generator 112b corresponds to (in this exemplary embodiment, coincides with) the device identification information stored by the device identification information storing part 112a, the demultiplexer circuit part 112 sends the accepted frame (the transmission frame) to the radio communication part 114. That is to say, in this case, the demultiplexer circuit part 112 transmits the accepted frame (the transmission frame) to the reception device (i.e., the communication device 150) configuring the transceiver device together with the transmission device itself. The demultiplexer circuit part 112 and the radio communication part 114 configure a unit data transmitting means.

On the other hand, in a case that the load balance ID generated by the device identification information generator 112b does not correspond to (in this exemplary embodiment, does not coincide with) the device identification information stored by the device identification information storing part 112a, the demultiplexer circuit part 112 sends the accepted frame (the transmission frame) to the second communication port 115. That is to say, in this case, the demultiplexer circuit part 112 sends the accepted frame (the transmission frame) to the communication device 120 that is a transmission device connected to the back stage side. The demultiplexer circuit part 112 and the second communication port 115 configure a unit data sending means.

The multiplexer circuit part 113 accepts a frame (a reception frame) via the radio communication part 114 or the second communication port 115. The multiplexer circuit part 113 sends the accepted frame (the reception frame) to the first communication port 111.

The radio communication part 114 includes a radio communicating antenna, which is not shown in the drawings. The radio communication part 114 transmits the frame (the transmission frame) sent by the demultiplexer circuit part 112, to the communication device 150 configuring the transceiver device together with the communication device 110, via the radio communicating antenna.

On the other hand, the radio communication part 114 receives the frame (the reception frame) transmitted by the communication device 150, via the radio communicating antenna. The radio communication part 114 sends the received frame (the reception frame) to the multiplexer circuit part 113.

The second communication port 115 has a like configuration as the first communication port 111.

Furthermore, the second communication port 115 is connected to the first communication port included in the communication device 120. In a like manner, the second communication port included in the communication device 120 is connected to the first communication port included in the communication device 130. In a like manner, the second communication port included in the communication device 130 is connected to the first communication port included in the communication device 140.

Thus, the communication devices (the transmission devices) 110 to 140 are connected in series.

On the other hand, the second communication port included in the communication device 150 is connected to the first communication port included in the communication device 160. In a like manner, the second communication port included in the communication device 160 is connected to the first communication port included in the communication device 170. In a like manner, the second communication port included in the communication device 170 is connected to the first communication port included in the communication device 180.

Thus, the communication devices (the reception devices) 150 to 180 are also connected in series.

(Operation)

Next, an operation of the communication system 1 configured as described above will be described with reference to FIG. 4.

First, when the communication device 110 accepts a transmission frame from the server device connected to the front stage side (a unit data accepting step), the device identification information generator 112b of the communication device 110 generates a load balance ID from header information included in the accepted transmission frame, in accordance with the abovementioned generation process (step 401; a transmission device identification information generating step).

Next, the demultiplexer circuit part 112 of the communication device 110 determines whether or not the generated load balance ID coincides with the device identification information stored by the device identification information storing part 112a of the communication device 110.

Here, assuming the generated load balance ID coincides with the device identification information for identifying the communication device 130, the description will be continued.

In this case, the demultiplexer circuit part 112 of the communication device 110 determines that the generated load balance ID does not coincide with the device identification information stored by the device identification information storing part 112a of the communication device 110 (step 402). Then, the demultiplexer circuit part 112 of the communication device 110 sends the accepted transmission frame to the communication device 120 connected to the back stage side, via the second communication port 115 (a unit data sending step).

When the communication device 120 accepts the transmission frame from the communication device 110 (a unit data accepting step), the communication device 120 generates a load balance ID from the header information included in the accepted transmission frame, in accordance with the abovementioned generation process (step 403; a transmission device identification information generating step).

Next, the communication device 120 determines whether or not the generated load balance ID coincides with the device identification information stored by the device identification information storing part of the communication device 120. According to the abovementioned assumption, the communication device 120 determines that the generated load balance ID does not coincide with the device identification information stored by the device identification information storing part of the communication device 120 (step 404). Then, the communication device 120 sends the accepted transmission frame to the communication device 130 connected to the back stage side, via the second communication port (a unit data sending step).

When the communication device 130 accepts the transmission frame from the communication device 120 (a unit data accepting step), the communication device 130 generates a load balance ID from the header information included in the accepted transmission frame, in accordance with the abovementioned generation process (step 405; a transmission device identification information generating step).

Next, the communication device 130 determines whether or not the generated load balance ID coincides with the device identification information stored by the device identification information storing part of the communication device 130. According to the abovementioned assumption, the communication device 130 determines that the generated load balance ID coincides with the device identification information stored by the device identification information storing part of the communication device 130 (step 406).

Then, the communication device 130 transmits the accepted transmission frame to the communication device 170 serving as a reception device configuring a transceiver device together with the communication device 130 (a unit data transmitting step).

The communication device 170 receives the frame transmitted by the communication device 130, and sends the received frame (the reception frame) to the communication device 160 connected to the back stage side.

Upon acceptance of the reception frame from the communication device 170, the communication device 160 sends the accepted reception frame to the communication device 150 connected to the back stage side.

Thus, the communication device 150 serving as a reception device on the most back stage side can accept all of the reception frames received by the respective communication devices 150 to 180 (i.e., the transmission frames transmitted by the respective communication devices 110 to 140).

Although the abovementioned operation of the communication system 1 is an example in a case that a load balance ID generated based on a transmission frame coincides with the device identification information for identifying the communication device 130, a like description can be applied to a case that the load balance ID coincides with device identification information for identifying a communication device other than the communication device 130.

As described above, according to the first exemplary embodiment of the communication system of the present invention, it is possible to. simultaneously transmit and receive a plurality of frames (unit data) by using a plurality of transceiver devices. Consequently, it is possible to make a communication bandwidth broader (a communication speed higher) than in the case of transmitting and receiving data by using only one transceiver device.

Additionally, according to the communication system 1 described above, by connecting a new transmission device to existing transmission devices, it is possible to easily add the transmission device to the communication system 1. Moreover, by disconnecting a connected transmission device, it is possible to easily remove the transmission device from the communication system I. Thus, according to the communication device 1 described above, by adding or removing a transmission device to or from the communication system 1, it is possible to easily change a communication bandwidth.

<Second Exemplary Embodiment>

Next, a communication system according to a second exemplary embodiment of the present invention will be described. The communication system according to the second exemplary embodiment is different from the communication system according to the first exemplary embodiment in changing a generation process used for generating a load balance ID when more communication load is placed on a specific transceiver device. Therefore, a description will be made focusing on the different point.

(Configuration)

The communication device 110 of the second exemplary embodiment is equipped with, in addition to the first and second communication ports 111 to 115, a reception frame amount acquiring part (a reception data amount acquiring means) 116 and a generation process change instruction sending part 117.

Every time a frame is received by the radio communication part 114, the reception frame amount acquiring part 116 acquires the data amount of the received frame (a frame amount). That is to say, the reception frame amount acquiring part 116 acquires the amount of data transmitted and received between a transmission device and a reception device (here, the communication device 110 and the communication device 150) configuring one transceiver device.

Then, every time a preset acquisition time elapses, the reception frame amount acquiring part 116 sends a control frame including the sum of the frame amounts acquired during the acquisition time (a reception frame amount) to the radio communication part (a data amount transmitting means) 114. That is to say, the radio communication part 114 and the reception frame amount acquiring part 116 configure a communication data amount acquiring means.

Further, the multiplexer circuit part 113 determines whether or not the device itself is positioned on the most front side among the plurality of transmission devices. In this exemplary embodiment, the multiplexer circuit part 113 previously stores information whether or not the device itself is positioned on the most front side among the plurality of transmission devices, and executes the abovementioned determination based on the information.

In the case of determining that the device itself is positioned on the most front side among the plurality of transmission devices, the multiplexer circuit part 113 sends the reception frame amount included in each of a control frame accepted via the radio communication part 114 and a control frame accepted via the second communication port 115, to the generation process change instruction sending part 117.

On the other hand, in the case of determining that the device itself is not positioned on the most front side among the plurality of transmission devices, the multiplexer circuit part 113 sends a control frame accepted via the radio communication part 114 and a control frame accepted via the second communication port 115, to the first communication port 111.

The multiplexer circuit part 113 and the radio communication part 114 configure a data amount receiving means. Moreover, the first communication port 111 and the multiplexer circuit part 113 configure a data amount sending means. Furthermore, the first communication port 111, the multiplexer circuit part 113 and the second communication port 115 configure a data amount transferring means.

The generation process change instruction sending part 117 accepts the reception frame amount of each of the plurality of transceiver devices from the multiplexer circuit part 113. When the deviation of the accepted reception frame amount is larger than a preset threshold, the generation process change instruction sending part 117 sends a generation process change instruction to the demultiplexer circuit part 112.

In this exemplary embodiment, the deviation of the reception frame amount is the absolute value of the difference between the average of the reception frame amounts of all of the transceiver devices and each of the reception frame amounts. Moreover, a generation process change instruction is information on an instruction to change a generation method used for generating a load balance ID.

Upon acceptance of the generation process change instruction from the first communication port 111 or the generation process change instruction sending part 117, the demultiplexer circuit part 112 here changes the generation process from a process of generating a load balance ID based on information representing a MAC address to a process of generating a load balance ID based on information representing VLAN-ID. The demultiplexer circuit part 112 may change the number of bits used for generating a load balance ID. The demultiplexer circuit part 112 configures a generation process changing means.

Furthermore, upon acceptance of the generation process change instruction from the first communication port 111 or the generation process change instruction sending part 117, the demultiplexer circuit part 112 sends a control frame including the accepted generation process change instruction to the second communication port 115. That is to say, the demultiplexer circuit part 112 sends the control frame including the accepted generation process change instruction to the communication device 120 connected to the back stage side.

The demultiplexer circuit part 112, the second communication port 115 and the generation process change instruction sending part 117 configure a generation process change instruction sending means. Moreover, the first communication port 111, the demultiplexer circuit part 112 and the second communication port 115 configure a generation process change instruction transferring means.

(Operation)

Figure 6:
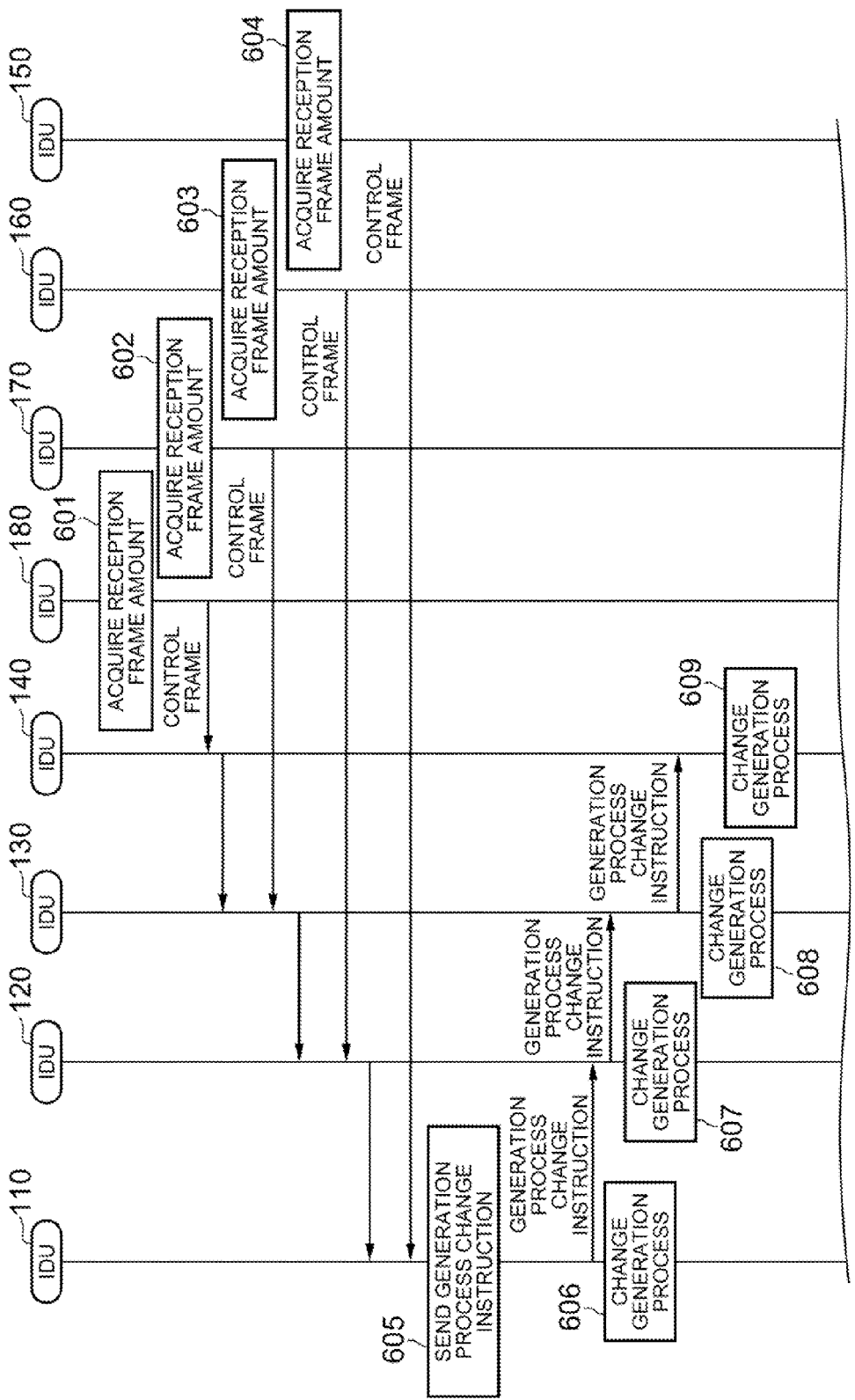
FIG. 6 is a sequence diagram showing an operation of a communication system according to the second exemplary embodiment of the present invention.

Next, an operation of the communication system 1 of the second exemplary embodiment when changing the generation process based on the reception frame amount will be described with reference to FIG. 6.

As mentioned above, the reception frame amount acquiring part of each of the communication devices 150 to 180 serving as reception devices acquires the data amount of a frame received via the radio communication part (a communication data amount acquiring step). Moreover, every time the abovementioned acquisition time elapses, the reception frame amount acquiring part of each of the communication devices 150 to 180 sends a control frame that includes the sum of the frame amounts acquired during the acquisition time (a reception frame amount), to the radio communication part. Thus, the radio communication part transmits the control frame to the transmission device configuring the transceiver device together with the reception device.

To be specific, the communication device 180 transmits the control frame to the communication device 140 (step 601), the communication device 170 transmits the control frame to the communication device 130 (step 602), the communication device 160 transmits the control frame to the communication device 120 (step 603), and the communication device 150 transmits the control frame to the communication device 110 (step 604).

Upon reception of the control frame from the communication device 180, the communication device 140 determines whether or not the device itself is positioned on the most front side among the plurality of transmission devices. Then, the communication device 140 determines that the device itself is not positioned on the most front side among the plurality of transmission devices, and sends the received control frame to the communication device 130 via the first communication port.

Further, upon reception of the control frame from the communication device 170, the communication device 130 determines whether or not the device itself is positioned on the most front side among the plurality of transmission devices. Then, the communication device 130 determines that the device itself is not positioned on the most front side among the plurality of transmission devices, and sends the received control frame and the control frame accepted from the communication device 140, to the communication device 120 via the first communication port.

In a like manner, upon reception of the control frame from the communication device 160, the communication device 120 determines whether or not the device itself is positioned on the most front side among the plurality of transmission devices. Then, the communication device 120 determines that the device itself is not positioned on the most front side among the plurality of transmission devices, and sends the received control frame and the control frame accepted from the communication device 130, to the communication device 110 via the first communication port.

Further, upon reception of the control frame from the communication device 150, the communication device 110 determines whether or not the device itself is positioned on the most front side among the plurality of transmission devices. Then, the communication device 110 determines that the device itself is positioned on the most front side among the plurality of transmission devices, and sends the reception frame amount included in each of the received control frame and the control frame accepted from the communication device 120, to the generation process change instruction sending part 117 of the communication device 110.

The generation process change instruction sending part 117 of the communication device 110 accepts the reception frame amount of each of the plurality of transceiver devices from the multiplexer circuit part 113 of the communication device 110. Then, the generation process change instruction sending part 117 determines whether or not the deviation of the accepted reception frame amount is larger than the abovementioned threshold.

Here, assuming the deviation of the reception frame amount accepted by the generation process change instruction sending part 117 is larger than the abovementioned threshold, the description will be continued.

In this case, the generation process change instruction sending part 117 of the communication device 110 sends a generation process change instruction to the demultiplexer circuit part 112 of the communication device 110 (step 605).

Thus, the communication device 110 sends the generation process change instruction to the communication device 120 via the second communication port 115. Moreover, the communication device 120 sends the generation process change instruction accepted from the communication device 110, to the communication device 130. In a like manner, the communication device 130 sends the generation process change instruction accepted from the communication device 120, to the communication device 140.

Further, the communication device 110 here changes a generation process used for generating a load balance ID in accordance with the generation process change instruction (step 606). In a like manner, each of the communication devices 120 to 140 here changes a generation process used for generating a load balance ID in accordance with the generation process change instruction having been accepted (step 607 to step 609).

As described above, according to the second exemplary embodiment of the communication system of the present invention, it is possible to produce like actions and effects as in the first exemplary embodiment.

<Third Exemplary Embodiment>

Next, a communication system according to a third exemplary embodiment of the present invention will be described with reference to FIG. 7.

The communication system according to the third exemplary embodiment is equipped with a plurality of transceiver devices each composed of a transmission device that transmits unit data obtained by decomposing data by a predetermined unit in order to transmit and receive the data and a reception device that receives the unit data transmitted by the transmission device.

Further, the transmission devices are connected in series.

Figure 7:
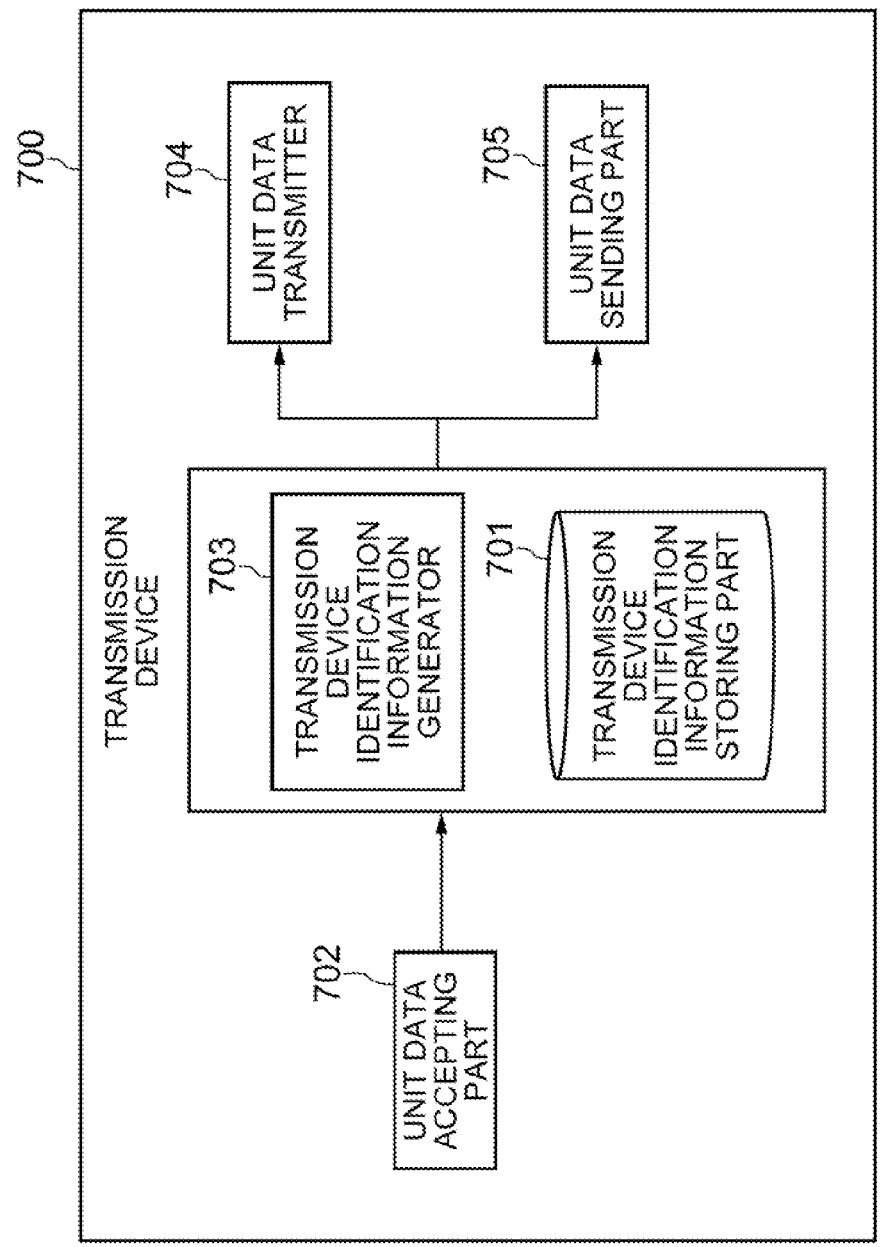
FIG. 7 is a block diagram schematically showing a function of a communication device according to a third exemplary embodiment of the present invention.

Furthermore, as shown in FIG. 7, a function of a transmission device 700 includes a transmission device identification information storing part (a transmission device identification information storing means) 701, a unit data accepting part (a unit data accepting means) 702, a transmission device identification information generator (a transmission device identification information generating means) 703, a unit data transmitter (a unit data transmitting means) 704, and a unit data sending part (a unit data sending means) 705.

The transmission device identification information storing part 701 stores transmission device identification information for identifying the device itself.

The unit data accepting part 702 accepts unit data from the front stage side.

The transmission device identification information generator 703 generates transmission device identification information for identifying any one of the plurality of transmission devices from in-unit-data information included in the unit data accepted by the unit data accepting part 702, in accordance with a predetermined generation process.

In a case that the transmission device identification information generated by the transmission device identification information generator 703 corresponds to the transmission device identification information stored by the transmission device identification information storing part 701, the unit data transmitter 704 transmits the unit data accepted by the unit data accepting part 702 to the reception device configuring the transceiver device together with the transmission device.

In a case that the transmission device identification information generated by the transmission device identification information generator 703 does not correspond to the transmission device identification information stored by the transmission device identification information storing part 701, the unit data sending part 705 sends the unit data accepted by the unit data accepting part 702 to the transmission device connected to the back stage side.

According to the communication system of the third exemplary embodiment, it is possible to simultaneously transmit and receive plural pieces of unit data by using the plurality of transceiver devices. Thus, it is possible to make a communication bandwidth larger (a communication speed higher) than in the case of transmitting and receiving data by using only one transceiver device.

In addition, according to this communication system, by connecting a new transmission device to the existing transmission devices, it is possible to easily add the transmission device to the communication system. Moreover, it is possible to easily remove a transmission device from the communication system by disconnecting the transmission device connected thereto. Thus, according to the communication system described above, it is possible to easily change a communication bandwidth by adding or removing a transmission device to or from the communication system.

In this case, it is preferred that the plurality of reception devices are connected in series; and each of the reception devices is configured to receive the unit data transmitted by the transmission device configuring the transceiver device together with the reception device and send the received unit data to the reception device connected to a back stage side.

According to this, a reception device positioned on the most back stage side can accept all the unit data transmitted by the plurality of transmission devices.

In this case, it is preferred that the communication system is equipped with a communication data amount acquiring means configured to acquire, from each of the plurality of transceiver devices, an amount of data transmitted and received between the transmission device and the reception device configuring the transceiver device, and the communication system is configured to change the generation process used by the transmission device identification information generating means in a case that a deviation of the acquired data amount is larger than a predetermined threshold.

According to this, it is possible to avoid continuance of a state that more communication load is placed on a specific transceiver device.

In this case, it is preferred that the communication data amount acquiring means includes: a reception data amount acquiring means configured to acquire a data amount of the received unit data; and a data amount transmitting means configured to transmit the data amount acquired by the reception device to the transmission device configuring the transceiver device together with the reception device, and it is preferred that the transmission device is equipped with: a data amount receiving means configured to receive the data amount transmitted by the reception device configuring the transceiver device together with the transmission device; a data amount sending means configured to send the received data amount to the transmission device connected to a front stage side; a data amount transferring means configured to accept the data amount sent by the transmission device connected to the back stage side, and send the accepted data amount to the transmission device connected to the front stage side; a generation process change instruction sending means configured to, in a case that the device itself is positioned on a most front stage side among the plurality of transmission devices, accept the data amount of each of the plurality of transceiver devices sent by the transmission device connected to the back stage side and, when a deviation of the accepted data amount is larger than the threshold, send a generation process change instruction of instructing to change the generation process used by the transmission device identification information generating means to the transmission device connected to the back stage side; a generation process change instruction transferring means configured to accept the generation process change instruction sent by the transmission device connected to the front stage side, and send the accepted generation process change instruction to the transmission device connected to the back stage side; and a generation process changing means configured to change the generation process used by the transmission device identification information generating means, in accordance with the generation process change instruction.

In this case, it is preferred that the transceiver device is configured to transmit and receive the unit data by performing radio communication.

In this case, it is preferred that the in-unit-data information is information including at least one of information representing a MAC (Media Access Control) address, information representing VLAN (Virtual Local Area Network) ID (Identification), information representing an MPLS (Multi Protocol Label Switching) label, and information representing an IP (Internet Protocol) address.

Further, a transmission device of another embodiment of the present invention is equipped with: a transmission device identification information storing means configured to store transmission device identification information for identifying the device itself; a unit data accepting means configured to accept unit data obtained by decomposing data by a predetermined unit in order to transmit and receive the data; a transmission device identification information generating means configured to generate transmission device identification information from in-unit-data information included in the accepted unit data, in accordance with a predetermined generation process; a unit data transmitting means configured to, in a case that the generated transmission device identification information corresponds to the stored transmission device identification information, transmit the accepted unit data to a reception device configuring a transceiver device together with the device itself; and a unit data sending means configured to, in a case that the generated transmission device identification information does not correspond to the stored transmission device identification information, send the accepted unit data.

Further, a communication method of another embodiment of the present invention is applied to a communication system which is equipped with a plurality of transceiver devices each composed of a transmission device that transmits unit data obtained by decomposing data by a predetermined unit in order to transmit and receive the data and a reception device that receives the unit data transmitted by the transmission device, and in which the plurality of transmission devices are connected in series.

Furthermore, the communication method is a method including: accepting the unit data from a front stage side, by the transmission device; generating transmission device identification information for identifying any one of the plurality of transmission devices from in-unit-data information included in the accepted unit data, in accordance with a predetermined generation process, by the transmission device; in a case that transmission device identification information stored by the storing device in order to identify the device itself corresponds to the transmission device identification information generated by the transmission device, transmitting the accepted unit data to the reception device configuring the transceiver device together with the transmission device; and in a case that transmission device identification information stored by the storing device in order to identify the device itself does not correspond to the transmission device identification information generated by the transmission device, sending the accepted unit data to the transmission device connected to a back stage side.

In this case, it is preferred that the communication method includes, in a case that the plurality of reception devices are connected in series, receiving unit data transmitted by the transmission device configuring the transceiver device together with the reception device and sending the received unit data to the reception device connected to a back stage side, by the reception device.

In this case, it is preferred that the communication method includes: from each of the plurality of transceiver devices, acquiring an amount of data transmitted and received between the transmission device and the reception device configuring the transceiver device; and in a case that a deviation of the acquired data amount is larger than a predetermined threshold, changing the generation process used for generating the transmission device identification information.

Further, a computer program of another embodiment of the present invention is a computer program for causing a transmission device to realize: a unit data accepting means configured to accept unit data obtained by decomposing data by a predetermined unit in order to transmit and receive the data, from a front stage side; a transmission device identification information generating means configured to generate transmission device identification information from in-unit-data information included in the accepted unit data in accordance with a predetermined generation process; a unit data transmitting means configured to, in a case that transmission device identification information stored by the transmission device in order to identify the device itself corresponds to the generated transmission device identification information, transmit the accepted unit data to a reception device configuring a transceiver device together with the device itself; and a unit data sending means configured to, in a case that transmission device identification information stored by the transmission device in order to identify the device itself does not correspond to the generated transmission device identification information, send the accepted unit data to a back stage side.

Inventions of a transmission device, a communication method or a computer program having the abovementioned configurations have like actions as the abovementioned communication system, and therefore, can achieve the object of the present invention mentioned above.

Although the present invention has been described with reference to the respective exemplary embodiments described above, the present invention is not limited to the abovementioned exemplary embodiments. The configuration and details of the present invention can be altered within the scope of the present invention in various manners that can be understood by those skilled in the art.

For example, the respective functions of the communication device are realized by hardware such as circuits in the respective exemplary embodiments described above, but may be realized by execution of a program or the like by a processing device. In this case, the program may be stored in a storing device, or may be stored in a recording medium that can be read by a computer. For example, the recording medium is a portable medium such as a flexible disk, an optical disk, a magneto-optical disk, and a semiconductor memory.

Further, as a modified example of the abovementioned exemplary embodiments, any combination of the abovementioned exemplary embodiments and modified examples may be employed.

The present invention can be applied to a communication system that performs radio communication using microwaves, and so on.

The invention claimed is:

1. A communication system comprising a plurality of transceiver devices each having a transmission device that transmits unit data obtained by decomposing data by a predetermined unit in order to transmit and receive the data and a reception device that receives the unit data transmitted by the transmission device, wherein:
   the plurality of transmission devices are connected in series; and
   each of the plurality of transmission devices includes:
   a transmission device identification information storing unit configured to store transmission device identification information for identifying the transmission device itself;
   a unit data accepting unit configured to accept the unit data from a front stage side;
   a transmission device identification information generating unit configured to generate transmission device identification information for identifying any one of the plurality of transmission devices from in-unit-data information included in the accepted unit data, in accordance with a predetermined generation process;
   a unit data transmitting unit configured to, in a case that the generated transmission device identification information corresponds to the stored transmission device identification information, transmit the accepted unit data to the reception device that together with the transmission device itself configures the transceiver device so that the reception device and the transmission device itself are parts of it; and a unit data sending unit configured to, in a case that the generated transmission device identification information does not correspond to the stored transmission device identification information, transmit the accepted unit data to a transmission device connected to a back stage side.

2. The communication system according to claim 1, wherein:
   the plurality of reception devices are connected in series; and
   each of the plurality of reception devices is configured to receive the unit data transmitted by the transmission device that together with the reception device itself configures the transceiver device so that the transmission device and the reception device itself are parts of it and transmit the received unit data to a reception device connected to a back stage side.

3. The communication system according to claim 1 comprising a communication data amount acquiring unit configured to acquire, from each of the plurality of transceiver devices, an amount of data transmitted and received between the transmission device and the reception device that together with the transmission device itself configuring the transceiver device so that the reception device and the transmission device itself are parts of it, and the communication system being configured to change the generation process used by the transmission device identification information generating unit in a case that a deviation of the acquired data amount is larger than a predetermined threshold.

4. The communication system according to claim 3, wherein:
   the communication data amount acquiring unit includes:
   a reception data amount acquiring unit configured to acquire a data amount of the received unit data; and
   a data amount transmitting unit configured to transmit the data amount acquired by the reception device to the transmission device that together with the reception device itself configures the transceiver device so that the transmission device and the reception device itself are parts of it; and
   the transmission device includes:
   a data amount receiving unit configured to receive the data amount transmitted by the reception device that together with the transmission device itself configures the transceiver device so that the reception device and the transmission device itself are parts of it;
   a data amount sending unit configured to transmit the received data amount to a transmission device connected to a front stage side;
   a data amount transferring unit configured to accept the data amount sent by the transmission device connected to the back stage side, and transmit the accepted data amount to the transmission device connected to the front stage side;
   a generation process change instruction sending unit configured to, in a case that the transmission device itself is positioned on a most front stage side among the plurality of transmission devices, accept the data amount of each of the plurality of transceiver devices sent by the transmission device connected to the back stage side and, when a deviation of the accepted data amount is larger than the threshold, transmit a generation process change instruction of instructing to change the generation process used by the transmission device identification information generating unit to the transmission device connected to the back stage side;
   a generation process change instruction transferring unit configured to accept the generation process change instruction sent by the transmission device connected to the front stage side, and send transmit the accepted generation process change instruction to the transmission device connected to the back stage side; and
   a generation process changing unit configured to change the generation process used by the transmission device identification information generating unit, in accordance with the generation process change instruction.

5. The communication system according to claim 1, wherein the transceiver device is configured to transmit and receive the unit data by performing radio communication.

6. The communication system according to claim 1, wherein the in-unit-data
   information is information including at least one of information representing a MAC (Media Access Control) address, information representing VLAN (Virtual Local Area Network) ID (Identification), information representing an MPLS (Multi Protocol Label Switching) label, and information representing an IP (Internet Protocol) address.

7. A transmission device comprising:
a transmission device identification information storing unit configured to store transmission device identification information for identifying the transmission device itself;
a unit data accepting unit configured to accept unit data obtained by decomposing data by a predetermined unit in order to transmit and receive the data;
a transmission device identification information generating unit configured to generate transmission device identification information from in-unit-data information included in the accepted unit data, in accordance with a predetermined generation process;
a unit data transmitting unit configured to, in a case that the generated transmission device identification information corresponds to the stored transmission device identification information, transmit the accepted unit data to a reception device that together with the transmission device itself configures a transceiver device so that the reception device and the transmission device itself are parts of it: and a unit data sending unit configured to, in a case that the generated transmission device identification information does not correspond to the stored transmission device identification information, send the accepted unit data.

8. A communication method applied to a communication system comprising a plurality of transceiver devices each having a transmission device that transmits unit data obtained by decomposing data by a predetermined unit in order to transmit and receive the data and a reception device that receives the unit data transmitted by the transmission device, the plurality of transmission devices being connected in series,
the communication method comprising:
accepting the unit data from a front stage side, by the transmission device; generating transmission device identification information for identifying any one of the plurality of transmission devices from in-unit-data information included in the accepted unit data, in accordance with a predetermined generation process, by the transmission device;
in a case that transmission device identification information stored by the transmission device in order to identify the transmission device itself corresponds to the transmission device identification information generated by the transmission device, transmitting, by the transmission device, the accepted unit data to the reception device that together with the transmission device itself configures the transceiver device so that the reception device and the transmission device itself are parts of it; and
in a case that transmission device identification information stored by the transmission device in order to identify the device itself does not correspond to the transmission device identification information generated by the transmission device, transmitting the accepted unit data to a transmission device connected to a back stage side, by the transmission device.

9. The communication method according to claim 8 comprising, in a
case that the plurality of reception devices are connected in series, receiving unit data transmitted by the transmission device that together with the reception device itself configures the transceiver device so that the transmission device and the reception device itself are parts of it and transmitting the received unit data to a reception device connected to a back stage side, by the reception device.

10. The communication method according to claim 8 comprising:
from each of the plurality of transceiver devices, acquiring an amount of data transmitted and received between the transmission device and the reception device that together with the transmission device itself configuring the transceiver device so that the reception device and the transmission device itself are parts of it; and
in a case that a deviation of the acquired data amount is larger than a predetermined threshold, changing the generation process used for generating the transmission device identification information.

11. A non-transitory computer-readable medium storing a computer program for causing a transmission device to realize:
a unit data accepting unit configured to accept unit data obtained by decomposing data by a predetermined unit in order to transmit and receive the data, from a front stage side;
a transmission device identification information generating unit configured to generate transmission device identification information from in-unit-data information included in the accepted unit data in accordance with a predetermined generation process;
a unit data transmitting unit configured to, in a case that transmission device identification information stored by the transmission device in order to identify the transmission device itself corresponds to the generated transmission device identification information, transmit the accepted unit data to a reception device so that together with the transmission device itself configures a transceiver device that the reception device and the transmission device itself are parts of it; and
a unit data sending unit configured to, in a case that transmission device identification information stored by the transmission device in order to identify the transmission device itself does not correspond to the generated transmission device identification information, send the accepted unit data to a back stage side.

12. A communication system comprising a plurality of transceiver devices each having a transmission device that transmits unit data obtained by decomposing data by a predetermined unit in order to transmit and receive the data and a reception device that receives the unit data transmitted by the transmission device, wherein:
the plurality of transmission devices are connected in series; and
each of plurality of the transmission devices includes:
a transmission device identification information storing means configured to store transmission device identification information for identifying the transmission device itself;
a unit data accepting means configured to accept the unit data from a front stage side;
a transmission device identification information generating means configured to generate transmission device identification information for identifying any one of the plurality of transmission devices from in-unit-data information included in the accepted unit data, in accordance with a predetermined generation process;
a unit data transmitting means configured to, in a case that the generated transmission device identification information corresponds to the stored transmission device identification information, transmit the accepted unit data to the reception device that together with the transmission device itself configures the transceiver device so that the reception device and the transmission device itself are parts of it; and a unit data sending means configured to, in a case that the generated transmission device identification information does not correspond to the stored transmission device identification information, transmit the accepted unit data to a transmission device connected to a back stage side.

13. A transmission device comprising:

a transmission device identification information storing means configured to store transmission device identification information for identifying the transmission device itself;

a unit data accepting means configured to accept unit data obtained by decomposing data by a predetermined unit in order to transmit and receive the data;

a transmission device identification information generating means configured to generate transmission device identification information from in-unit-data information included in the accepted unit data, in accordance with a predetermined generation process;

a unit data transmitting means configured to, in a case that the generated transmission device identification information corresponds to the stored transmission device identification information, transmit the accepted unit data to a reception device that together with the transmission device itself configures a transceiver device so that the reception device and the transmission device itself are parts of it; and a unit data sending means configured to, in a case that the generated transmission device identification information does not correspond to the stored transmission device identification information, send the accepted unit data.

* * * * *